US011736301B2

(12) United States Patent
Fries et al.

(10) Patent No.: US 11,736,301 B2
(45) Date of Patent: Aug. 22, 2023

(54) METHOD, SYSTEM, TRANSMITTER, AND RECEIVER FOR AUTHENTICATING A TRANSMITTER

(71) Applicants: Steffen Fries, Baldham (DE); Andreas Güttinger, Fürth (DE); Marco Lambio, Röthenbach a. d. Pegnitz (DE)

(72) Inventors: Steffen Fries, Baldham (DE); Andreas Güttinger, Fürth (DE); Marco Lambio, Röthenbach a. d. Pegnitz (DE)

(73) Assignee: Siemens Aktiengesellschaft, Munich (DE)

(*) Notice: Subject to any disclaimer, the term of this patent is extended or adjusted under 35 U.S.C. 154(b) by 68 days.

(21) Appl. No.: 17/334,699

(22) Filed: May 29, 2021

(65) Prior Publication Data

US 2021/0377046 A1 Dec. 2, 2021

(30) Foreign Application Priority Data

May 29, 2020 (EP) ..................................... 20177407

(51) Int. Cl.

| | |
|---|---|
| *H04L 29/06* | (2006.01) |
| *H04L 9/32* | (2006.01) |
| *G06F 21/45* | (2013.01) |
| *G06F 21/64* | (2013.01) |
| *H04L 9/08* | (2006.01) |
| *H04L 9/40* | (2022.01) |

(52) U.S. Cl.

CPC ............ *H04L 9/3247* (2013.01); *G06F 21/45* (2013.01); *G06F 21/64* (2013.01); *H04L 9/0894* (2013.01); *H04L 9/3226* (2013.01); *H04L 9/3263* (2013.01); *H04L 63/083* (2013.01)

(58) Field of Classification Search

CPC ... H04L 9/3247; H04L 9/0894; H04L 9/3226; H04L 9/3263; H04L 63/083; H04L 9/0825; H04L 9/0869; H04L 9/3297; H04L 63/0823; G06F 21/45; G06F 21/64

See application file for complete search history.

(56) References Cited

U.S. PATENT DOCUMENTS 7,225,337 B2 5/2007 Baessler
10,764,752 B1 * 9/2020 Avetisov ............ H04W 12/068
(Continued)

FOREIGN PATENT DOCUMENTS

CA 2879910 A1 * 1/2014 ......... H04L 63/0823
CN 100438619 C * 11/2008 ............... H04L 9/32
(Continued)

OTHER PUBLICATIONS

Examination Report cited in corresponding European application No. 20177407.2-1218; dated Nov. 2, 2020; 8 pp.

*Primary Examiner* — Sher A Khan

(74) *Attorney, Agent, or Firm* — Lempia Summerfield Katz LLC

(57) ABSTRACT

A method, system, transmitter, and receiver for authenticating a transmitter are disclosed. The authentication is performed using an asymmetric key pair and using a digital signature. The method for authenticating the transmitter includes generating a user identification, calculating the digital signature, generating an authentication request message, and transmitting the authentication request message to a receiver.

11 Claims, 2 Drawing Sheets

S E S55 E55 S10 S20 S30 S40 S50 E10 E20 E30 NW M1 M2 M3 M4

(56) References Cited

U.S. PATENT DOCUMENTS

2003/0221104 A1* 11/2003 Baessler ............... H04L 63/062 713/175
2006/0060065 A1* 3/2006 Abe ..................... G10H 1/0058 84/602
2006/0212520 A1* 9/2006 Logue ................. H04L 63/0823 709/206
2010/0191973 A1 7/2010 Huntzicker et al.
2013/0010954 A1* 1/2013 Falk .................... H04L 63/0442 380/255
2013/0217332 A1* 8/2013 Altman ..................... G01S 1/02 455/3.01
2014/0281498 A1* 9/2014 Bransom ............... H04L 9/3226 713/168
2018/0075262 A1* 3/2018 Auh ........................ G06F 21/78
2018/0248875 A1* 8/2018 Watanabe ........... H04L 63/0884
2019/0372403 A1* 12/2019 Park ..................... H04B 5/0075

FOREIGN PATENT DOCUMENTS

CN 107683582 A * 2/2018 ............. G06F 21/35
CN 108432180 A * 8/2018 ......... H04L 63/0209
CN 111628868 A * 9/2020 ............. G06F 21/64
CN 112889241 A * 6/2021 ........... G06Q 20/322
EP 1365537 A1 * 11/2003 ............. G06F 21/64
EP 1365537 A1 11/2003
EP 1501239 A1 1/2005
WO WO-03093923 A2 * 11/2003 ............. G06F 21/32
WO WO-2013174540 A1 * 11/2013 ............. G06F 21/44
WO WO-2020236651 A1 * 11/2020 ............. G06F 21/31

* cited by examiner

| Legend | |
|---|---|
| S10 | Secure Memory |
| S20 | A User Identification Generation Module |
| S30 | A Password Generation Module |
| S40 | An Authentication Request Module |
| S50 | A First Communication Module |
| S55 | A Bus |
| E10 | A Second Communication Module |
| E20 | An Inspection Model |
| E30 | An Authentication Module |
| E55 | A Bus |
| NW | A Communication Network |
| M1 | A First Message |
| M2 | A Second Message |
| M3 | A Third Message |
| M4 | A Fourth Message |

METHOD, SYSTEM, TRANSMITTER, AND RECEIVER FOR AUTHENTICATING A TRANSMITTER

This application claims the benefit of European Patent Application No. EP 20177407.2, filed on May 29, 2020, which is hereby incorporated by reference in its entirety.

BACKGROUND

The present embodiments relate to a method, to a system, to a transmitter, and to a receiver for authenticating a transmitter.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an alternative to existing solutions is provided.

According to a first aspect, a system including a transmitter. The transmitter includes a secure memory is provided. The secure memory is configured to store an asymmetric key pair. The asymmetric key pair includes a public key and a private key. The transmitter also includes a user identification generation module configured to generate a user identification based on registration data. The registration data includes the public key and/or certificate data of a digital certificate. The transmitter includes a password generation module configured to calculate a digital signature via the user identification using the private key. The password generation module is further configured to generate a password dataset based on the digital signature. The transmitter also includes an authentication request module configured to generate an authentication request message. The authentication request message includes the user identification and the password dataset. The transmitter includes a first communication module configured to transmit the authentication request message to a receiver. The receiver includes a second communication module configured to receive the authentication request message from the transmitter. The receiver also includes an inspection module configured to ascertain a check result for the digital signature of the password dataset based on the user identification. The receiver includes an authentication module configured to authenticate the transmitter based on the check result using an authentication message.

Unless stated otherwise in the following description, the terms "perform", "calculate", "computer-aided", "compute", "establish", "generate", "configure", "reconstruct" and the like may relate to operations and/or processes and/or processing acts that change and/or generate data and/or convert data into other data, where the data may be represented or be present, for example, in the form of physical variables (e.g., in the form of electrical pulses). The expression "computer" may, for example, be interpreted as broadly as possible in order, for example, to cover all electronic devices having data processing properties. Computers may thus, for example, be personal computers, servers, programmable logic controllers (PLC), hand-held computer systems, pocket PC devices, mobile radio devices, and other communication devices that are able to process data in a computer-aided manner, processors, and other electronic data processing devices.

"Computer-aided" in the context of the present embodiments may be, for example, an implementation of the method in which, for example, a processor performs at least one method act of the method. By way of example, "computer-aided" may also be "computer-implemented".

A processor or programmable processor in the context of the present embodiments may be, for example, an electronic circuit. This may, for example, be an integrated digital circuit. A processor may include, for example, a main processor (e.g., central processing unit (CPU)), a microprocessor or a microcontroller, a cryptoprocessor for performing cryptographic operations, an artificial intelligence (AI) processor for performing inference for an artificial neural network or a digital signal processor, possibly in combination with a storage unit for storing program commands, etc. A processor may also, for example, be an integrated circuit (IC) (e.g., a field-programmable gate array (FPGA)), an application-specific integrated circuit (ASIC), a digital signal processor (DSP), or a signal processing unit or a graphics processor (e.g., graphics processing unit (GPU)). A processor may also be a virtualized processor or a soft CPU. The processor may also be, for example, a programmable processor that is equipped with configuration acts for performing the method according to the present embodiments or is configured with configuration acts such that the programmable processor performs the features of the method, the component, the modules, or other aspects and/or sub-aspects of the present embodiments. An integrated semiconductor chip may be, for example, a digital semiconductor chip, a mixed-signal semiconductor chip, an MEMS semiconductor chip, or an integrated analog semiconductor chip or a transistor semiconductor chip having integrated control or protection functions.

A "module" in the context of the present embodiments may be, for example, a processor and/or a memory of the processor for storing program commands. By way of example, the circuit is specifically configured to execute the program commands such that the processor performs functions for implementing or for performing the method according to the present embodiments or an act of the method according to the present embodiments.

"Comprise", "have", and the like (e.g., with reference to data and/or information) in the context of the present embodiments may be, for example, storage (e.g., computer-aided storage) of a corresponding item of information or of a corresponding item of data in a data structure/dataset (e.g., stored in a memory).

The present embodiments are advantageous in that, by virtue of the proposed solution, existing asymmetric key material, for example, for existing authentication with user name and password is used. The method is based in this case, for example, on pre-existing communication protocols and mechanisms and replaces, for example, the generation and validation of the authentication parameters. This approach may be used, for example, when migrating to new currently used authentication methods, or when a local implementation of the connection to a hardware security module for using the existing asymmetric key material prevents direct application, as in a specified protocol. The security of the general user name/password method is able to be further increased in this case, for example, by using dynamic parameters.

This approach, for example, allows use of certificate-based authentication in the context of the HTTP protocol.

In one embodiment of the system, the registration data includes the digital certificate or the fingerprint (e.g., checksum) of the digital certificate or the serial number of a certificate together with the information about the issuer.

In further embodiments of the system, the registration data includes additional registration parameters, where the additional registration parameters include a timestamp and/or a nonce or/and device-specific transmitter parameter.

In further embodiments of the system, the registration data is calculated by the transmitter. The registration data is formed taking into consideration a timestamp and/or a nonce or/and device-specific transmitter parameter. The registration data is, for example, recalculated specifically for a corresponding authentication request message.

In further embodiments of the system, the digital certificate is a digital certificate for the public key.

In further embodiments of the system, the password dataset includes password generation-specific additional parameters, and/or the digital signature is calculated taking into consideration at least some of the additional parameters. The password generation-specific additional parameters include information about a hash algorithm of the digital signature and/or a padding scheme of the digital signature and/or a timestamp.

In further embodiments of the system, the transmitter and the receiver are temporally synchronized.

In further embodiments of the system, the timestamp and/or the device-specific transmitter parameters and/or the certificate data are additionally inspected during the ascertainment of the check result.

According to a further aspect, the present embodiments relate to a transmitter having a secure memory. The secure memory is configured to store an asymmetric key pair. The asymmetric key pair includes a public key and a private key. The transmitter also includes a user identification generation module configured to generate a user identification based on registration data. The registration data includes the public key and/or certificate data of a digital certificate. The transmitter includes a password generation module configured to calculate a digital signature via the user identification using the private key. The password generation module is configured to generate a password dataset of the digital signature. The transmitter also includes an authentication request module configured to generate an authentication request message. The authentication request message includes the user identification and the password dataset. The transmitter includes a first communication module configured to transmit the authentication request message to a receiver.

According to a further aspect, the present embodiments relates to a receiver having a second communication module configured to receive an authentication request message from a transmitter. The authentication request message includes a user identification and a password dataset. The receiver includes an inspection module configured to ascertain a check result for the digital signature of the password dataset based on the user identification. The receiver also includes an authentication module configured to authenticate the transmitter based on the check result using an authentication message.

According to a further aspect, the present embodiments relate to a computer-implemented method for authenticating a transmitter. The computer-implemented method includes storing an asymmetric key pair. The asymmetric key pair includes a public key and a private key. The computer-implemented method also includes generating a user identification based on registration data. The registration data includes the public key and/or certificate data of a digital certificate. The computer-implemented method includes calculating a digital signature via the user identification using the private key. A password dataset is created based on the digital signature. The computer-implemented method also includes generating an authentication request message. The authentication request message includes the user identification and the password dataset. The computer-implemented method includes transmitting the authentication request message to a receiver.

In further embodiments of the method, the method includes further method acts or features for implementing the functional features of the transmitter or for implementing further features of the transmitter or corresponding embodiments.

According to a further aspect, the present embodiments relate to a computer-implemented method for authenticating a transmitter. The computer-implemented method includes receiving an authentication request message from a transmitter. The authentication request message includes a user identification and a password dataset. The computer-implemented method also includes ascertaining a check result for the digital signature of the password dataset based on the user identification. The computer-implemented method includes authenticating the transmitter based on the check result via an authentication message.

In further embodiments of the method, the method includes further method acts or features for implementing the functional features of the receiver or for implementing further features of the receiver or corresponding embodiments.

According to a further aspect, the present embodiments relate to a computer-implemented method that includes the computer-implemented method for authenticating a transmitter and the computer-implemented method for authenticating the transmitter.

In further embodiments of the method, the method includes further method acts or features for implementing the functional features of the system or for implementing further features of the system or corresponding embodiments.

The present embodiments also include a computer program product containing program commands for performing one of the methods according to the present embodiments (or a combination of the methods). The corresponding method according to the present embodiments is able to be performed via the computer program product. A computer program product containing program commands for performing the corresponding method according to the present embodiments may also be, for example, a digital circuit description (e.g., a register transfer logic (RTL) code) in the form of VHDL code or Verilog code, or a network list or geometric data for the production of a semiconductor device (e.g., GDSII data).

The present embodiments also include a variant of the computer program product containing program commands for configuring a creation device, such as, for example, a 3D printer, a computer system, or a production machine suitable for creating processors and/or devices. The creation device is configured, by way of the program commands, such that the system according to the present embodiments and/or the receiver and/or the transmitter is created.

The present embodiments also include a provision device for storing and/or providing the computer program product. The provision device is, for example, a data carrier that stores and/or provides the computer program product. As an alternative and/or in addition, the provision device is, for example, a network service, a computer system, a server system (e.g., a distributed computer system), a cloud-based computer system, and/or virtual computer system that stores and/or provides the computer program product (e.g., in the form of a data stream).

This provision takes place, for example, as a download in the form of a program data block and/or command data block (e.g., as a file, such as as a download file or as a data stream; as a download data stream) of the complete computer program product. This provision may, however, also take place, for example, as a partial download that consists of multiple parts and is downloaded, for example, via a peer-to-peer network or provided as a data stream. Such a computer program product is installed in a system, for example, using the provision device in the form of the data carrier and executes the program commands such that the method according to the present embodiments is executed on a computer or configures the creation device such that the creation device creates the system according to the present embodiments and/or the transmitter and/or the receiver.

BRIEF DESCRIPTION OF THE DRAWINGS

The above-described properties, features, and advantages of the present embodiments, and the manner in which they are achieved, become more clearly and distinctly comprehensible in connection with the following description of the exemplary embodiments, which are explained in more detail in connection with the figures.

DETAILED DESCRIPTION

In the figures, elements with the same function are provided with the same reference signs, unless stated otherwise.

The following exemplary embodiments, unless stated otherwise or already stated, have at least one processor and/or one storage unit for implementing or executing the method.

A person of ordinary skill in the art having knowledge of the one or more method claims is also, for example, aware of all options for producing products or implementation options that are routine in the prior art, and so there is, for example, no need for any independent disclosure in the description. These customary implementation variants known to a person skilled in the art may, for example, be implemented solely through hardware (e.g., components) or solely through software (e.g., components). As an alternative and/or in addition, a person skilled in the art may, within the scope of his expert knowledge, select as far as possible any combinations of hardware (e.g., components) and software (e.g., components) for implementation variants according to the present embodiments.

A combination of hardware (e.g., components) and software (e.g., components) may be involved in the present embodiments, for example, when some of the effects of the present embodiments are brought about exclusively, for example, by special hardware (e.g., a processor in the form of an ASIC or FPGA) and/or others are brought about by the software (e.g., processor-aided and/or memory-aided software). A combination of hardware (e.g., components) and software (e.g., components) may also be implemented, for example, by hardware simulated in software.

In view of the high number of different implementation options, it is, for example, impossible and also not beneficial or necessary for the understanding of the present embodiments to cite all of these implementation options. In this respect, all of the following exemplary embodiments are intended, for example, to show only a number of ways, by way of example, as to how, for example, such implementations of the teaching of the present embodiments may look.

The features of the individual exemplary embodiments are therefore, for example, not restricted to the respective exemplary embodiment, but rather, refer, for example, to the present embodiments in general. Features of one exemplary embodiment may accordingly also serve as features for another exemplary embodiment (e.g., without this having to be mentioned explicitly in the respective exemplary embodiment).

Figure 1:
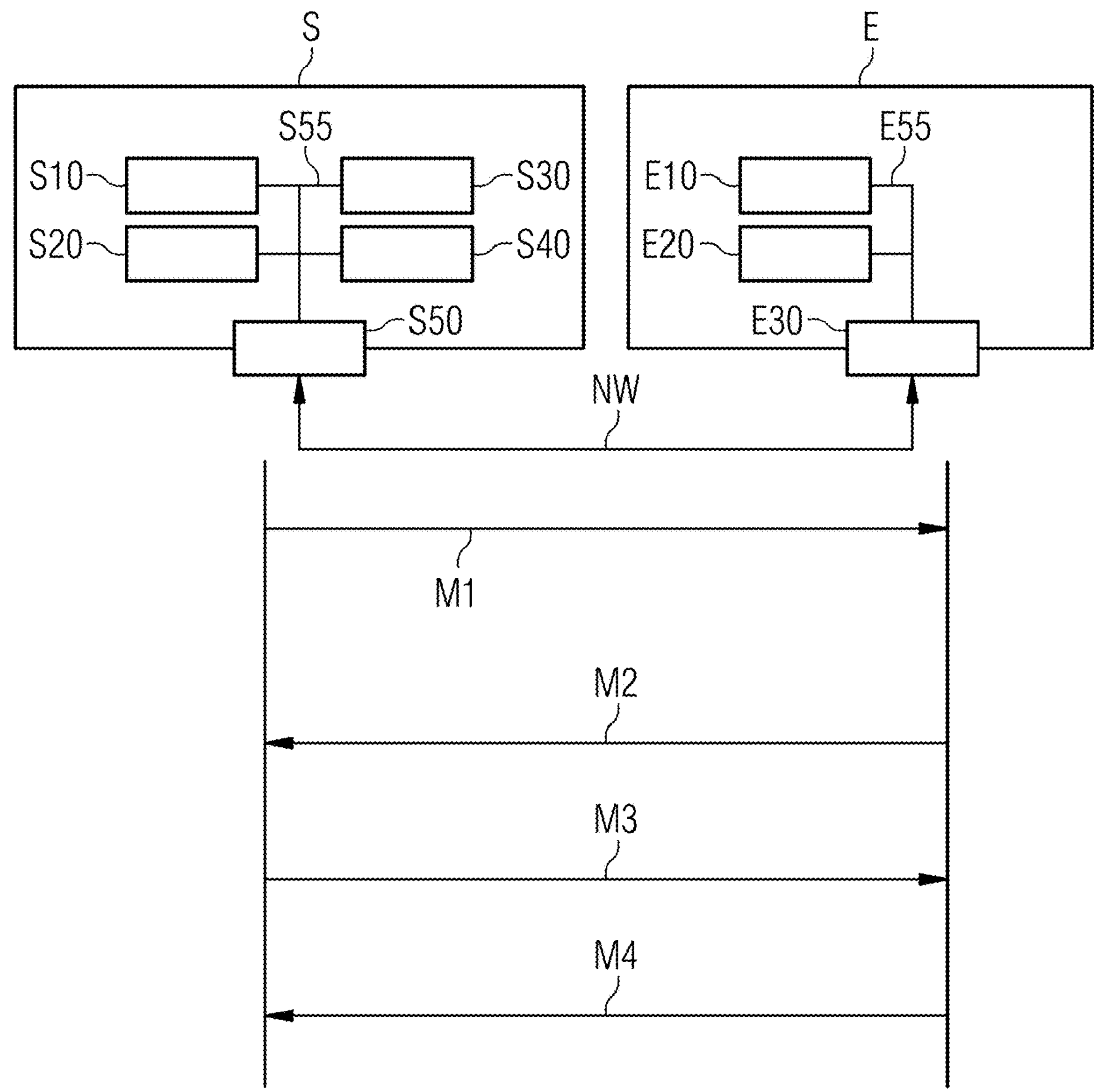
FIG. 1 schematically shows a first exemplary embodiment.

FIG. 1 shows a schematic illustration of the system X, where the system X includes a transmitter S and a receiver E.

The transmitter S in this case includes, for example, a secure memory S10 (e.g., a manipulation-proof memory/tamper-proof memory unit), a user identification generation module S20, a password generation module S30, an authentication request module S40, and a first communication module S50 (e.g., a mobile radio module, a wireless network module (such as a WLAN module), or a wired network module (such as an Ethernet module)) that are connected to one another in terms of communication via a bus S55 (e.g., a PCI bus or a PCIe bus). The modules may also be implemented, for example, as separate modules (e.g., as a smart card, USB device) and be connected in terms of communication to the transmitter, for example, via the bus S55 and via a data interface (e.g., smart card/USB interface).

The receiver E in this case includes, for example, a second communication module E10 (e.g., a mobile radio module, a wireless network module (such as a WLAN module) or a wired network module (e.g., an Ethernet module)), an inspection model E20, an authentication module E30, which are connected to one another in terms of communication via a bus E55 (e.g., a PCI bus or a PCIe bus).

The transmitter S and the receiver E are connected to one another, for example, via a communication network NW (e.g., Internet, WAN, LAN, or a mobile radio network).

The secure memory S10 is configured to store an asymmetric key pair, where the key pair includes a public key and a private key.

The user identification generation module S20 is configured to generate a user identification based on registration data, where the registration data includes the public key and/or certificate data of a digital certificate C_A. The public key may in this case, for example, match the digital certificate, such that this is able to be inspected by the public key.

The password generation module S30 is configured to calculate a digital signature via the user identification using the private key, where the password generation module is configured to generate a password dataset of the digital signature (e.g., based on the digital signature).

The authentication request module S40 is configured to generate an authentication request message, where the authentication request message includes the user identification and the password dataset.

The first communication module S50 is configured to transmit the authentication request message to a receiver.

The second communication module E10 is configured to receive an authentication request message from the transmitter S, where the authentication request message includes the user identification and the password dataset.

The inspection module E20 is configured to ascertain a check result for the digital signature of the password dataset based on the user identification.

The authentication module E30 is configured to authenticate the transmitter based on the check result using an authentication message.

In a further variant, the password dataset includes password generation-specific additional parameters, and/or the digital signature is calculated taking into consideration at least some of the additional parameters, where the password generation-specific additional parameters include information about a hash algorithm of the digital signature and/or a padding scheme of the digital signature and/or a timestamp TS.

In a further variant, the registration data includes additional registration parameters, where the additional registration parameters include a timestamp TS and/or a nonce N or/and device-specific transmitter parameter. The additional registration parameters may, for example, also include the password generation-specific additional parameters.

In a further variant, the certificate data includes the digital certificate C_A and/or a serial number SN_C_A of the digital certificate C_A or/and a timestamp TS and/or a nonce N or/and device-specific transmitter parameter and/or a fingerprint of the digital certificate, such as a checksum.

In a further variant, the registration data is calculated by the transmitter. The registration data is formed taking into consideration a timestamp TS and/or a nonce N or/and device-specific transmitter parameter. The registration data is, for example, recalculated specifically for a corresponding authentication request message.

In a further variant, the digital certificate C_A is a digital certificate for the public key.

In a further variant, the timestamp TS and/or the device-specific transmitter parameters and/or the certificate data is additionally inspected during the ascertainment of the check result.

By virtue of the present embodiments, the HTTP Basic Access Authentication is, for example, able to be performed using asymmetric methods.

In conventional HTTP Basic Access Authentication, a transmitter (e.g., client) attempts, for example, via a request, to access a resource on a receiver (e.g., server), for which transmitter authentication is to be provided. The receiver signals this via a "401 unauthorized" message in which the corresponding authentication method is signaled.

The transmitter then generates, based on the existing user name and password, the corresponding parameter that is then jointly sent in the next request in the authorization header. The parameter is in this case constructed as follows in accordance with RFC 2617:

```
basic-credentials = base64-user-pass
base64-user-pass = <base64 encoding of user-pass,
   except not limited to 76
   char/line>
user-pass = userid ":" password
userid = *<TEXT excluding ":">
password = *TEXT
```

Since base64 coding is able to be easily resolved and does not contain any dynamic item of data, an attacker is easily able to eavesdrop on the required credentials, decode the required credentials, and accordingly, misuse the required credentials. The conventional method is therefore recommended for use only with an underlying TLS connection and associated server authentication (e.g., the HTTP Basic Authentication may only be performed using this tunnel). Using both methods (e.g., TLS Server Authentication and HTTP Basic Authentication) achieves de-facto mutual authentication of both communication partners. The combination connects the server authentication on the transport layer using X.509 certificates and the user (e.g., transmitter/client) authentication on the application layer based on user identification and an associated password.

The conventional method is disadvantageous in that certificate-based authentication is not enabled in the context of the HTTP protocol. It is also not possible to migrate existing systems to new authentication methods. It is additionally not possible, using the conventional method, to increase the security of the general user name/password method.

In the system according to the present embodiments, the transmitter (e.g., client) includes the asymmetric key pair (PubKeyA, PrivKeyA).

In one variant, the transmitter may include a certificate C_A for the public key. The certificate is constructed, for example, in accordance with the ITU-T X.509 standard and has, for example, a serial number SN_C_A. For integration purposes, the existing parameters may, for example, be applied differently in the scheme.

The ascertainment of the user identification (e.g., a user name) is explained by way of example below, the user identification itself as a structure being structured as follows and in the process replacing the parameter "userid" from the conventional method:

```
User identification = base 64 (registration data) "|"
   Additional registration parameters
```

The parameter registration data (e.g., credentials) is in this case, for example, base64-encoded and may be extended with additional registration parameters. In this case, for example, the pipe symbol "|" is used as a separating sign for the various parameters (e.g., ":" is not permitted for user names as per RFC 2617). The use of additional registration parameters may optionally be dealt with.

The password dataset replaces, for example, the parameter "password" from the conventional method. The password dataset is in this case, for example, likewise formed as a structure and consists of the actual signature and the password generation-specific additional parameters. These password generation-specific additional parameters may, for example, include the selected hash algorithm and/or the padding scheme and/or further parameters (e.g., param1, param2).

In the context of the password dataset, for example, the separating sign ":" is permitted according to RFC 2617 and may be used, for example, in an implementation according to this standard.

The password dataset is composed, for example, as follows:

```
password = param1 ":" param2 ":"
   base64(sig[user identification],
     PrivKeyA)
```

The signature is calculated, for example, as a digital signature via the parameter user identification using the private key (PrivKeyA). This information is then, for example, base64-coded.

Depending on the existing key material, the digital signature may, for example, be calculated using RSA or ECDSA.

By virtue of the proposed solution, existing asymmetric key material may also be taken as a basis for using an existing authentication with user name and password. The method is based in this case on pre-existing communication protocols and mechanisms and replaces only the generation and validation of the authentication parameters. This approach may be used, for example, when migrating to new currently used authentication methods, or when a local implementation of the connection to a hardware security module prevents direct application as in a specified protocol. The security of the general user name/password method is able to be increased in this case by using dynamic parameters.

This approach, for example, allows use of certificate-based authentication in the context of the HTTP protocol.

By virtue of the present embodiments, the transmitter may, for example, send an authentication or an authentication request message to a receiver. The authentication or an authentication request message is in accordance with the HTTP protocol and may comply with the specifications of RFC 2617. The authentication request message is accordingly an authentication request message in accordance with RFC 2617.

By virtue of the present embodiments, the receiver may, for example, authenticate the transmitter or send an authentication message to the transmitter. The authentication or an authentication message is in accordance with the HTTP protocol and may comply with the specifications of RFC 2617. The authentication message is accordingly an authentication message in accordance with RFC 2617.

FIG. 1 illustrates, by way of example, authentication of the transmitter/client by way of the HTTP protocol. The transmitter first of all sends a first message M1, for example, in the form of a request (e.g., an HTTP request such as GET) to the receiver. The receiver responds to the first message M1 with a second message M2 that the transmitter has to authenticate itself at the receiver. The second massage M2 includes, for example, an HTTP 401 Unauthorized parameter containing a WWW-Authenticate: Basic realm=ForgottenRealms.

In response, the transmitter generates a third message M3, which is, for example, an authentication request message, and transmits the third message M3 to the receiver E. In this case, the transmitter stores the digital certificate C_A and additional registration parameters in the form of a timestamp TS in the registration data. In order to ascertain the timestamp TS, the local clock of the transmitter is, for example, queried. The querying time is in this case, for example, the time at which the transmitter received the first message M2, or the time at which the registration data is ascertained. The digital certificate C_A may be base64-encoded prior to storage in the registration data. On the basis of the registration data, the user identification is then calculated and is likewise base64-encoded.

The transmitter S then uses the user identification to calculate a digital signature with the aid of the private key. The password dataset is then ascertained based on the digital signature, where the password dataset includes a password generation-specific additional parameter that specifies which hash function (e.g., SHA256) was used to calculate the digital signature. The digital signature and/or password generation-specific additional parameters may be base64-encoded and then stored, for example, in the password dataset. The password dataset, containing the digital signature (e.g., encoded digital signature), the password generation-specific additional parameter (e.g., encoded), and the encoded user identification are stored in the third message M3, which is, for example, an authentication request message, and then transmitted to the receiver E.

Following reception of the third message M3 by the receiver E, the receiver first of all decodes the encoded user identification, the encoded digital signature, and the encoded password generation-specific additional parameter based on the base64 format. The digital certificate stored in the user identification is then decoded based on the base64 format. The receiver E then inspects the certificate and compares the timestamp TS with its local time. The result of this check is stored, for example, in the check result or in a further check result. The check is deemed successful if the certificate was able to be verified successfully and the timestamp TS does not deviate from the local time or exhibits a deviation that does not exceed a predefined tolerance value.

If this check is unsuccessful, the transmitter is not authenticated. If the check result or the further check result indicates that the check was successful, the digital signature is, for example, first of all decoded from the password dataset in accordance with the base64 format.

The digital signature is then inspected using the digital certificate in conjunction with the hash function (e.g., SHA256) specified by the password generation-specific additional parameter. The result of this inspection may be stored in the check result or be stored in a further check result. If this check is unsuccessful, the transmitter is not authenticated. If the check result or the further check result indicates that the check was successful, the transmitter S is, for example, authenticated by the receiver E by way of a fourth message M4 (e.g., by the authentication message).

In other words, FIG. 1 shows, for example, how the receiver (e.g., server) verifies the component parts of the authorization header. The receiver, for example, checks the transmitted certificate in accordance with the known rules (e.g., validity, issuer, revocation status, etc.). The receiver E additionally checks, for example, when transmitting the timestamp TS, whether this is within a predefined interval. Depending on the security policy, a drift between the local clocks may thus, for example, be at least partially compensated. The receiver also checks, for example, using the certificate of the transmitter, whether the signature is able to be validated based on the user identification.

A list is given below showing exemplary possible implementation variants of the registration data:

1. Registration data=public key (PubKeyA)

One advantage of this implementation variant is that, for example, use of certificate-based authentication in the context of the HTTP protocol is enabled.

2. Registration data=public key (PubKeyA) with additional registration parameters {timestamp TS or/and nonce N or/and device-specific parameter}

One advantage of this implementation variant is that a public key with additional registration parameters is used. This introduces, for example, a dynamic component into the method, using which, for example, reintroduction of eavesdropped parameters is able to be detected. If, for example, a timestamp TS is used in the additional registration parameters, the transmitter and the receiver may be temporally synchronized.

3. Registration data=digital certificate C_A

One advantage of this implementation variant is that the receiver is, for example, able to check the identity of the transmitter based on the digital certificate C_A when the receiver trusts the issuing authority (e.g., certification authority) issuing the certificate.

4. Registration data=digital certificate C_A
with additional registration parameters
{timestamp TS or/and nonce N or/and
device-specific parameter}

One advantage of this implementation variant is that the receiver is, for example, able to identify the transmitter, as explained, for example, in implementation variant 3. If, for example, a timestamp TS is used in the additional registration parameters, the transmitter and the receiver may be temporally synchronized. By virtue of the additional dynamic additional registration parameters (e.g., timestamp TS or/and nonce N) in the method, these are able to detect for example the reintroduction of eavesdropped parameters.

5. Registration data=serial number SN_C_A with
additional registration parameters
{Issuer or/and timestamp TS or/and nonce
N or/and device-specific parameter}

In this implementation variant, the certificate C_A is known to the receiver, such that, instead of the certificate, the serial number of the certificate may also be used for identification, for example. In this case, the issuer of the certificate may also be, for example, specified in the additional registration parameters. The receiver may know the corresponding digital certificate C_A. By using the serial number instead of the certificate, the parameter, to be transported, of the additional registration parameters, for example, becomes smaller, such that it is possible to save on bandwidth and/or memory space. This variant may be used, for example, in the event of repeated requests when the receiver has stored the certificate of the transmitter in a first query/authentication message or through configuration.

6. Registration data=fingerprint [C_A] with additional registration parameters
{timestamp TS or/and nonce N or/and device-specific parameter}

In this implementation variant, the certificate C_A is known to the receiver. However, instead of the certificate, a checksum (e.g., a fingerprint in the form of a hash (such as SHA256)) of the certificate C_A may also be used for identification. It is, for example, not necessary in this case to specify the issuer of the digital certificate C_A. The receiver may already be aware of the digital certificate. By using the fingerprint/checksum instead of the certificate, the parameter, to be transported, of the additional registration parameters, for example, becomes smaller, such that it is possible to save on bandwidth and/or memory space. This variant may be used, for example, in the event of repeated requests when the receiver has stored the certificate of the transmitter in a first query/authentication message or through configuration.

Figure 2:
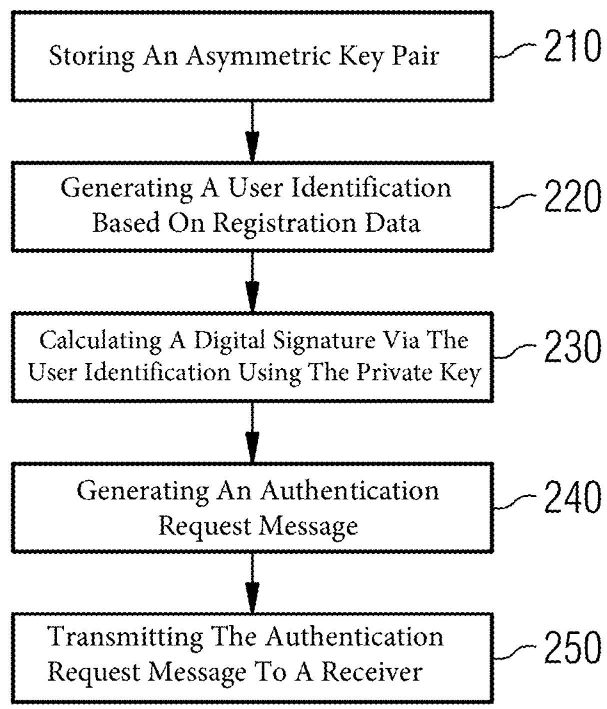
FIG. 2 schematically shows a further exemplary embodiment.

FIG. 2 shows a further exemplary embodiment of the present embodiments that is illustrated in the form of a flowchart for a method.

The method may be performed in a computer-aided manner.

In detail, this exemplary embodiment illustrates a computer-implemented method for authenticating a transmitter, where the method is, for example, a method in accordance with the HTTP protocol and may be a method in accordance with the HTTP protocol according to RFC 2617.

The method includes a first method act 210 of storing an asymmetric key pair, where the key pair includes a public key and a private key.

The method includes a second method act 220 of generating a user identification based on registration data, where the registration data includes the public key and/or certificate data of a digital certificate.

The method includes a third method act 230 of calculating a digital signature via the user identification using the private key, where a password dataset is calculated based on the digital signature.

The method includes a fourth method act 240 of generating an authentication request message, where the authentication request message includes the user identification and the password dataset.

The method includes a fifth method act 250 of transmitting the authentication request message to a receiver.

Figure 3:
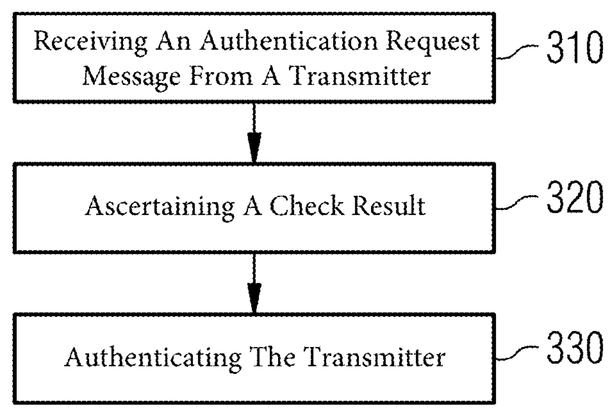
FIG. 3 schematically shows a further exemplary embodiment.

FIG. 3 shows a further exemplary embodiment of the present embodiments that is illustrated in the form of a flowchart for a method.

The method may be performed in a computer-aided manner.

In detail, this exemplary embodiment illustrates a computer-implemented method for authenticating a transmitter, where the method is, for example, a method in accordance with the HTTP protocol and may be a method in accordance with the HTTP protocol according to RFC 2617.

The method includes a first method act 310 of receiving an authentication request message from a transmitter, where the authentication request message includes a user identification and a password dataset.

The method includes a second method act 320 of ascertaining a check result for the digital signature of the password dataset based on the user identification.

The method includes a third method act 330 of authenticating the transmitter based on the check result by way of an authentication message.

One exemplary embodiment not illustrated in any figure relates to a computer-implemented method, where the method includes the method that is illustrated in FIG. 2 and the method that is illustrated in FIG. 3. One exemplary embodiment of the method that is not illustrated in any figure may be a method in accordance with the HTTP protocol and, for example, a method in accordance with the HTTP protocol according to RFC 2617.

Although the invention has been illustrated and described in more detail by the exemplary embodiments, the invention is not restricted by the disclosed examples, and other variations may be derived therefrom by a person skilled in the art without departing from the scope of protection of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A system comprising:

a transmitter comprising:

a secure memory configured to store an asymmetric key pair, the asymmetric key pair comprising a public key and a private key;

a user identification generation module configured to generate a user identification based on registration data, the registration data comprising the public key, certificate data of a digital certificate, or the public key and the certificate data of the digital certificate;

a password generation module configured to:

calculate a digital signature via the user identification using the private key; and generate a password dataset based on the digital signature, the password dataset including password generation-specific additional parameters, wherein at least one of the password generation-specific additional parameters includes information about a hash algorithm of the digital signature;

an authentication request module configured to generate an authentication request message, the authentication request message comprising the user identification and the password dataset; and a first communication module configured to transmit the authentication request message to a receiver;

the receiver comprising:

a second communication module, wherein the second communication module is configured to receive the authentication request message from the transmitter;

an inspection module configured to ascertain a check result for the digital signature of the password dataset based on the user identification, the digital signature being inspected using the digital certificate in conjunction with the hash algorithm specified by the at least one of the password generation-specific additional parameters; and an authentication module configured to authenticate the transmitter based on the check result using an authentication message.

2. The system of claim 1, wherein the registration data comprises additional registration parameters, the additional registration parameters comprising a timestamp, a nonce, device-specific transmitter parameters, or any combination thereof.

3. The system of claim 1, wherein the certificate data comprises the digital certificate, a serial number of the digital certificate, a timestamp, a nonce, device-specific transmitter parameters, a fingerprint of the digital certificate, or any combination thereof.

4. The system of claim 3, wherein the certificate data comprises a checksum.

5. The system of claim 1, wherein the registration data is calculated by the transmitter, wherein the registration data is formed taking into consideration a timestamp, a nonce, device-specific transmitter parameters, or any combination thereof, and wherein the registration data is recalculated specifically for a corresponding authentication request message.

6. The system of claim 1, wherein the digital certificate is a digital certificate for the public key.

7. The system of claim 1, wherein the digital signature is calculated taking into consideration at least some of the additional parameters, and wherein the password generation-specific additional parameters further comprise information about a padding scheme of the digital signature, a timestamp, or any combination thereof.

8. The system of claim 1, wherein the transmitter and the receiver are temporally synchronized.

9. The system of claim 1, wherein a timestamp, device-specific transmitter parameters, the certificate data, or any combination thereof is additionally inspected during the ascertainment of the check result.

10. A computer-implemented method for authenticating a transmitter, the computer-implemented method comprising:

storing an asymmetric key pair, wherein the asymmetric key pair comprises a public key and a private key;

generating a user identification based on registration data, wherein the registration data comprises the public key, certificate data of a digital certificate, or the public key and the certificate data of the digital certificate;

calculating a digital signature via the user identification using the private key, wherein a password dataset is ascertained based on the digital signature, the password dataset including password generation-specific additional parameters, wherein at least one of the password generation-specific additional parameters includes information about a hash algorithm of the digital signature;

generating an authentication request message, wherein the authentication request message comprises the user identification and the password dataset;

transmitting the authentication request message to a receiver;

receiving the authentication request message from the transmitter;

ascertaining a check result for the digital signature of the password dataset based on the user identification, the digital signature being inspected using the digital certificate in conjunction with the hash algorithm specified by the at least one of the password generation-specific additional parameters; and authenticating the transmitter based on the check result via an authentication message.

11. In a non-transitory computer-readable storage medium that stores instructions executable by one or more processors to authenticate a transmitter, the instructions comprising:

storing an asymmetric key pair, wherein the asymmetric key pair comprises a public key and a private key;

generating a user identification based on registration data, wherein the registration data comprises the public key, certificate data of a digital certificate, or the public key and the certificate data of the digital certificate;

calculating a digital signature via the user identification using the private key, wherein a password dataset is ascertained based on the digital signature, the password dataset including password generation-specific additional parameters, wherein at least one of the password generation-specific additional parameters includes information about a hash algorithm of the digital signature;

generating an authentication request message, wherein the authentication request message comprises the user identification and the password dataset;

transmitting the authentication request message to a receiver;

receiving the authentication request message from the transmitter;

ascertaining a check result for the digital signature of the password dataset based on the user identification, the digital signature being inspected using the digital certificate in conjunction with the hash algorithm specified by the at least one of the password generation-specific additional parameters; and authenticating the transmitter based on the check result via an authentication message.

* * * * *